(No Model.)
W. J. & M. R. LITTELL.
GAGE MEASURE.
No. 526,926.  Patented Oct. 2, 1894.
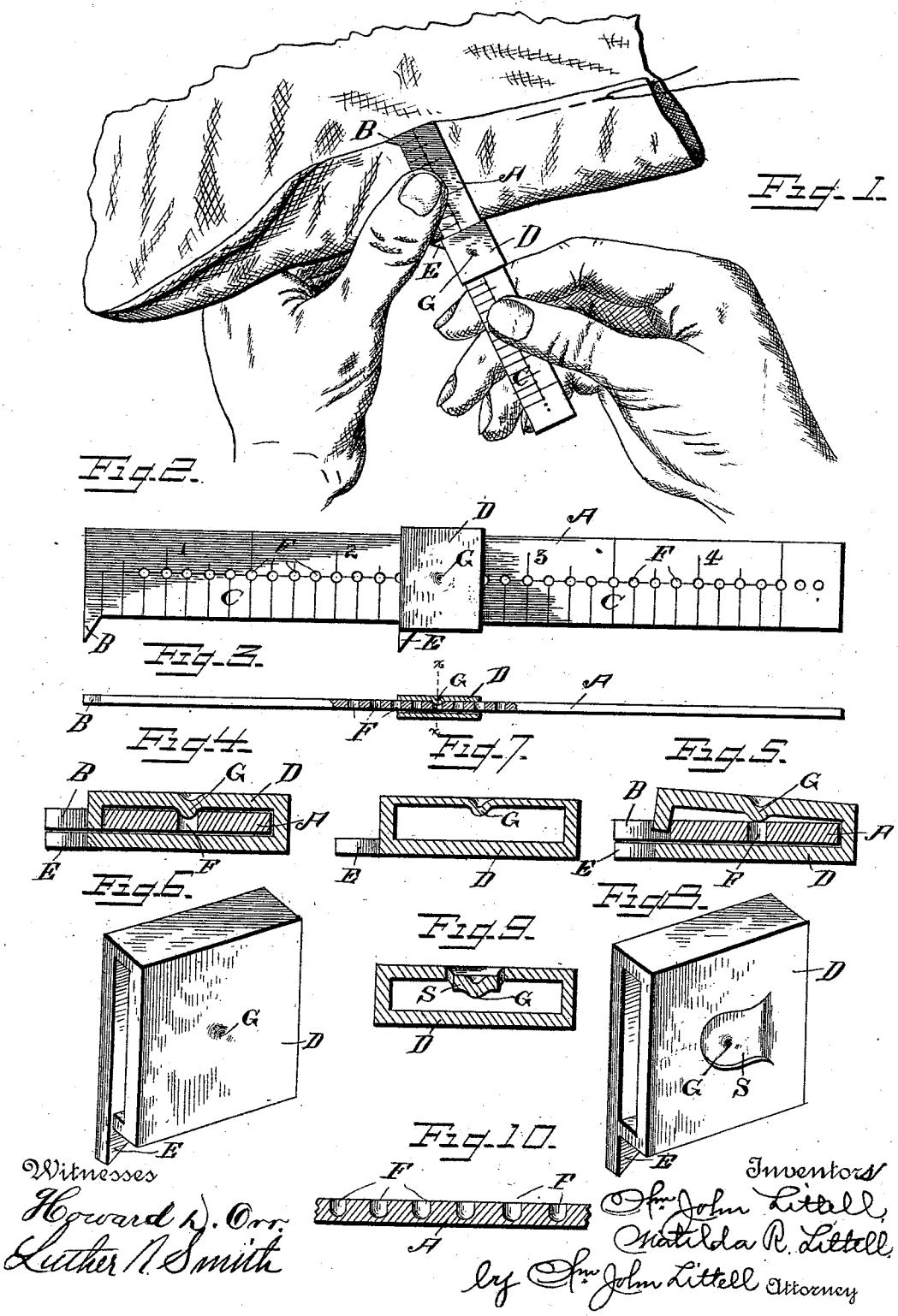

UNITED STATES PATENT OFFICE.

WILLIAM JOHN LITTELL AND MATILDA R. LITTELL, OF WASHINGTON, DISTRICT OF COLUMBIA.

GAGE-MEASURE.

SPECIFICATION forming part of Letters Patent No. 526,926, dated October 2, 1894.

Application filed November 23, 1893. Serial No. 491,749. (No model.)

*To all whom it may concern:*

Be it known that we, WILLIAM JOHN LITTELL and MATILDA R. LITTELL, citizens of the United States, residing at Washington, District of Columbia, have invented certain new and useful Improvements in Measures or Gages, of which the following is a specification.

This invention relates to measures or gages, and it has for its object to provide a simple and efficient device of this character designed for use in sewing or kindred work, and one possessing advantages in point of inexpensiveness in manufacture and durability in use.

A further object of the invention is to provide a measure or gage which may be readily adjusted to indicate or gage the desired depth of hems, the proper distances between buttons and button-holes, spaces between rows of trimming, widths of seams, measurements in drawn-work, hemstitching and various other branches of needlework.

To this end, the invention consists, substantially, in a main member carrying a fixed indicating point or finger, and an indicator adjustable to or from said point or finger, as will be hereinafter more fully described and particularly pointed out in the claims.

In the drawings, Figure 1 is a perspective view, illustrating the measure or gage in use. Fig. 2 is a front elevation of the measure or gage. Fig. 3 is an edge view thereof, partly in section. Fig. 4 is an enlarged transverse sectional view, taken on the line *x—x*, Fig. 3. Fig. 5 is a similar sectional view, illustrating the adjustment of the slide. Fig. 6 is a detail perspective view of the slide. Fig. 7 is a transverse sectional view of the latter, illustrating a modification. Figs. 8 and 9 are respectively perspective and transverse sectional views of the slide and illustrating a further modification. Fig. 10 is a detail longitudinal sectional view of the main member, and showing a modified construction thereof.

Corresponding parts in all the figures are denoted by the same letters of reference.

Heretofore, in ascertaining the measurements for which this invention is designed it has been the common practice to notch a piece of card board, the measurement being indicated by the space between one corner of the card board and a notch, or between two notches. The objection to this practice, aside from its obvious crudity, is that when a different measurement is desired, the card board must again be notched, resulting in confusion and error in use, or a new piece of card-board must be substituted. A further objection lies in the fact that when a measurement is to be based upon a scale of inches or fractional parts, a scale measure must be brought into use to determine the point at which the card board is to be notched. To overcome these objections and disadvantages, we have devised the measure or gage which will now be described, and which is adapted for instant and ready adjustment or readjustment according to scale.

Referring to the drawings, A designates the main member which consists of a flat elongated plate, preferably rectangular in cross-section. This plate is provided at one side its distal end with a fixed indicating point or finger, B, the outer edge of the latter being flush with the end of the plate, and the inner edge beveled toward the plate. The front face of the plate A is provided with a scale, C, formed by transverse, equi-distant lines indented or otherwise produced upon the plate.

Adjustable longitudinally upon the plate A is a slide, D. This slide is preferably constructed from a sheet-metal strip, the latter being struck or bent up into the form of a band, corresponding to and working upon the plate A. The abutting ends of the strip forming the slide D are left unsecured, for a purpose hereinafter to be described, and said slide is provided upon the lower one of said ends with an indicating point or finger, E. The latter corresponds to the point or finger B, and is located at a point upon the slide nearest to, and projecting in the same direction as, said point or finger B.

To effect automatic locking of the slides into the position to which it is adjusted, and at the same time permit of ready readjustment of the slide, the means which will now be described have been devised. The plate A is provided with a central, longitudinal series of perforations, F, the latter being located at the divisional points of the scale C. In lieu, however, of perforations, depressions similarly located may be provided, as shown in Fig. 10.

As above stated, the abutting ends of the slide D are left unsecured, thus imparting a spring or yielding power to the top plate of the slide. This top plate is provided centrally upon its under side with a depending stud or lug, G, formed by indenting the top plate from its outer side. This stud is adapted to engage one of the series of perforations F and prevent accidental displacement of the slide, the adjustment of the slide being accomplished by pressure upon either end thereof, according to the direction in which it is to be moved.

The operation and advantages of our invention will be manifest to those versed in the character of work to which it appertains. To effect an adjustment, the member A is held in one hand of the operator and the slide engaged either at its front or rear edge by the thumb and forefinger of the free hand. Pressure being applied, the stud G is caused to ride out of the perforation F with which it is engaged, and over the intermediate perforations until it engages the one desired. Such adjustment is effected by reason of the yielding of the top plate of the slide.

In practice, the scale is preferably graded to inches and eighth parts thereof, a perforation or depression being located at each divisional point. The distance between the outer edge of the slide and the stud G is also gaged to accord with the division of the scale. For instance, assuming that an adjustment of two inches is desired (it being understood that all measurements are taken from the outer edge of the point or finger B to the corresponding edge of the point or finger E), the slide is adjusted until its outer edge coincides with the two-inch mark, when by reason of the distance between said edge and the stud G, the latter registers with and engages one of the perforations F.

We do not wish to be understood as limiting ourselves to the precise construction above described, as numerous modifications may be made without departing from the spirit and scope of our invention. For instance, in Fig. 7 we have shown a modified construction of slide, in which the same is made in the form of an endless band, and to insure proper action of the stud G the upper plate of the slide is reduced in thickness. By this means the said upper plate is rendered sufficiently yielding to permit the stud G to ride out of and over the perforations in the member A during adjustment of the slide. In Figs. 8 and 9 another modification of the slide is shown. In this case the slide is also in the form of an endless band, the stud G being carried by a spring tongue, S, struck inwardly from the face of the upper plate of the slide. Both of these modified forms of slide are also preferably constructed from a sheet-metal strip, the abutting ends of which being secured together by soldering or in any other suitable manner. We therefore reserve the right to these and all other legitimate modifications.

We claim as our invention—

1. As an improved article of manufacture, a measure or gage comprising a main member provided with a fixed indicating point or finger having a straight, outer edge located at right angles to said main member, and a longitudinally-adjustable slide working on the latter and provided with a corresponding indicating point or finger having a similar straight outer edge; substantially as set forth.

2. As an improved article of manufacture, a measure or gage comprising a main member provided with a fixed indicating point or finger having a straight, outer edge located at right angles to said main member, a longitudinally-adjustable slide working on the latter and provided with a corresponding indicating point or finger having a similar straight outer edge, and means for automatically locking said slide in adjusted position; substantially as set forth.

3. As an improved article of manufacture, a measure or gage consisting of a main member provided with a longitudinal series of perforations or depressions, and a longitudinally-adjustable indicating slide working on said main member and comprising an integral, yielding top plate provided with an inwardly-projecting stud adapted to engage one of said perforations or depressions; substantially as set forth.

4. In a measure or gage, the combination, with a main member provided with a graduated scale, and with a longitudinal series of perforations or depressions located respectively at the divisional points of said scale, of a longitudinally-adjustable slide provided with a yielding stud adapted to automatically engage one of said perforations or depressions to lock the slide in adjusted position; substantially as set forth.

5. In a measure or gage, the combination, with a main member provided with a scale upon its front face and a longitudinal series of perforations or depressions, of a longitudinally-adjustable slide encircling said member and provided with an indicating point or finger, and with a yielding stud projecting inwardly from said slide and adapted to coincide with and engage one of said series of perforations or depressions when the point or indicator registers with a divisional point of the scale; substantially as set forth.

6. As an improved article of manufacture, a sewing measure or gage consisting of a main member comprising an elongated plate provided with a longitudinal series of perforations or depressions, and a slide working on said main member and constructed from a spring-metal strip bent into the form of a band and having its top plate provided with an inwardly-projecting stud adapted to engage one of the series of perforations or depressions in the main member; substantially as set forth.

7. As an improved article of manufacture, a sewing measure or gage consisting of a main member comprising an elongated plate provided at one end with a fixed indicating point or finger projecting from one side thereof, and with a longitudinal series of perforations or depressions, and an adjustable slide encircling said main member and constructed from a spring-metal strip bent into the form of a band and having an indicating point or finger corresponding to the point or finger of the main member, said slide being provided with a stud struck inwardly from its top plate and adapted to engage one of said series of perforations or depressions; substantially as set forth.

8. As an improved article of manufacture, a measure or gage consisting of a main member comprising an elongated plate provided at one end with a fixed indicating point or finger projecting from one side thereof, and with a longitudinal series of perforations or depressions, and an adjustable slide encircling said main member and constructed from a spring-metal strip bent into the form of an unsecured band and having an indicating point or finger projecting from the flat bottom plate of the slide and corresponding to the point or finger of the main member, said slide being provided with a stud struck inwardly from its top plate and adapted to engage one of said series of perforations or depressions; substantially as set forth.

In testimony whereof we affix our signatures in presence of two witnesses.

WILLIAM JOHN LITTELL.
MATILDA R. LITTELL.

Witnesses:
LOUIS SCHRAG,
KATHARINE E. WOOD.